United States Patent
Declerck et al.

(10) Patent No.: US 10,042,124 B2
(45) Date of Patent: Aug. 7, 2018

(54) SEALING AND RETENTION PLUG FOR A HYBRID CABLE

(71) Applicant: TYCO ELECTRONICS RAYCHEM BVBA, Kessel-Lo (BE)

(72) Inventors: Thierry Mike Declerck, Kumtich (BE); Nicolas De Jaegere, Schilde (BE)

(73) Assignee: COMMSCOPE CONNECTIVITY BELGIUM BVBA (BE)

( * ) Notice: Subject to any disclaimer, the term of this patent is extended or adjusted under 35 U.S.C. 154(b) by 0 days.

(21) Appl. No.: 15/520,769

(22) PCT Filed: Oct. 20, 2015

(86) PCT No.: PCT/EP2015/074230
§ 371 (c)(1),
(2) Date: Apr. 20, 2017

(87) PCT Pub. No.: WO2016/062700
PCT Pub. Date: Apr. 28, 2016

(65) Prior Publication Data
US 2017/0322378 A1    Nov. 9, 2017

Related U.S. Application Data

(60) Provisional application No. 62/066,230, filed on Oct. 20, 2014.

(51) Int. Cl.
*G02B 6/38* (2006.01)
*H01R 13/58* (2006.01)
*H01R 13/52* (2006.01)
*H01R 43/00* (2006.01)

(52) U.S. Cl.
CPC ......... *G02B 6/3816* (2013.01); *G02B 6/3817* (2013.01); *G02B 6/3889* (2013.01); *G02B 6/3894* (2013.01); *H01R 13/5221* (2013.01); *H01R 13/582* (2013.01); *H01R 43/005* (2013.01)

(58) Field of Classification Search
CPC ............................ G02B 6/3889; G02B 6/3817
See application file for complete search history.

(56) References Cited

U.S. PATENT DOCUMENTS

| | | | |
|---|---|---|---|
| 5,074,638 A * | 12/1991 | Poli | G02B 6/3817 385/50 |
| 6,222,977 B1 | 4/2001 | Kawada et al. | |
| 2013/0108227 A1 | 5/2013 | Conner | |
| 2013/0294735 A1 | 11/2013 | Burris et al. | |

(Continued)

OTHER PUBLICATIONS

International Search Report and Written Opinion of the International Searching Authority for corresponding International Patent Application No. PCT/EP2015/074230 dated Jan. 25, 2016, 10 pgs.

*Primary Examiner* — Omar R Rojas
(74) *Attorney, Agent, or Firm* — Merchant & Gould P.C.

(57) ABSTRACT

A system (10) and method that facilitates the delivery of power and fiber communications together is provided. The system and method enables quick and easy connection of a hybrid cable (12) to telecommunication equipment. The system provides a sealed robust connection for both conductors (78, 80) and fibers (50) at a single location (56). It can be used to avoid the need for local powering of fiber based communication devices and networks.

22 Claims, 7 Drawing Sheets

(56) References Cited

U.S. PATENT DOCUMENTS

2014/0029898 A1   1/2014  Snyder et al.
2014/0140664 A1   5/2014  Islam
2017/0184798 A1*  6/2017  Coenegracht ........ G02B 6/3817

* cited by examiner

SEALING AND RETENTION PLUG FOR A HYBRID CABLE

CROSS-REFERENCE TO RELATED APPLICATION

This application is a National Stage Application of PCT/EP2015/074230, filed on Oct. 20, 2015, which claims the benefit of U.S. Patent Application Ser. No. 62/066,230, filed on Oct. 20, 2014, the disclosures of which are incorporated herein by reference in their entireties. To the extent appropriate, a claim of priority is made to each of the above disclosed applications.

BACKGROUND

Fiber optic based telecommunication services are being extended to an increasing number of businesses and homes. Many of these extensions of service within neighborhoods, industrial parks and business developments utilize optical fiber distribution cables laid within buried conduit. Such optical fiber distribution cables typically extend from a larger fiber distribution terminal or pedestal to a smaller fiber access terminal directly adjacent the business or home to which service may be provided. From the fiber access terminal to the home or business, a fiber drop cable may connect to the home or business.

When fiber optic cables are extended from a fiber distribution terminal to a fiber access terminal, a variety of techniques are available for sealing and anchoring the cables relative to the fiber access terminal. It is generally desirable to provide sealing and anchoring configurations that are secure, reliable, and cost effective. In certain applications it is desirable to provide both fibers for data transmission along with copper for power transmission. The integration of power and fiber communication into one system can greatly speed up installation of network devices. For example, the integration fiber and power (e.g., copper) can facilitate the installation of a variety of devices requiring optical communications and power such as: small cells, ONT's, FTTX, digital signage, industrial communications, POLAN, PoE or PoE+ extension, Wifi access points.

SUMMARY

The present disclosure provides a system and method that facilitates the delivery of power and fiber communications to telecommunication equipment. The system and method enables quick and easy connection of a hybrid cable to telecommunication equipment. The system provides a sealed robust connection for both conductors and fibers at a single location. The system and method can be used to avoid the need for local powering of fiber based communication devices and networks. In some applications, the system and method are employed to extend the distance that powered devices can be installed from the power source in Power over Ethernet (PoE+) installations. The powered device could be, for example, an IP camera, a wireless access point, or other building automation device located in an area where an electrical outlet is not readily available.

One embodiment of a method of connecting a jacketed hybrid electrical optical cable to telecommunication equipment includes the following steps: exposing end portions of a pair of conductors, one or more of optical fibers and a plurality of strength members from a distal end portion of a jacketed hybrid electrical optical cable; connecting a plug body to a closure such that a first end portion of the plug body is external to the closure and a second end portion of the plug body is internal to the closure; extending the distal end portion of the jacketed hybrid electrical optical cable through a first end portion of the plug body; securing the distal end portion of the jacketed hybrid electrical optical cable to the plug body; electrically connecting the pair of conductors of the jacketed hybrid electrical optical cable to a pair of metal tabs mounted in a potting housing of a plug body, the potting housing located at the second end portion of the plug body; extending a pair of secondary conductors through a cover assembly and engaging end portion of the pair of secondary conductors with conductive contacts located in the potting housing; guiding the plurality of optical fibers out of the cover assembly; positioning the cover assembly over the potting housing; and filling the potting housing with an epoxy.

In one embodiment a sealing and retention plug for a jacketed hybrid electrical optical cable includes the following features: a plug assembly including a plug body, the plug body including: a first end portion including an opening at a distal end configured to receive a jacketed hybrid electrical optical cable, the first end portion configured to slide over a distal end portion of a jacketed hybrid electrical optical cable; a second end portion including: a potting housing, the potting housing including a bottom wall and two opposed side walls; a cover assembly that is configured to slide over the potting housing, the cover assembly including a top wall, a bottom wall, an open first end and a second end wall, the second end wall including a pair of conductor apertures for receiving conductors and a fiber aperture for receiving one or more of optical fibers; and a closure interface assembly located between the first end portion and second end portion, the closure interface assembly includes a flange configured to engage the exterior of a closure, the closure interface assembly further comprises a treaded barrel adjacent the flange and a nut that is configured to engage the threaded barrel and tightened to drive the flange against the closure and compress an O-ring positioned around the threaded barrel thereby creating a seal between the closure and the plug.

DETAILED DESCRIPTION

Figure 1:
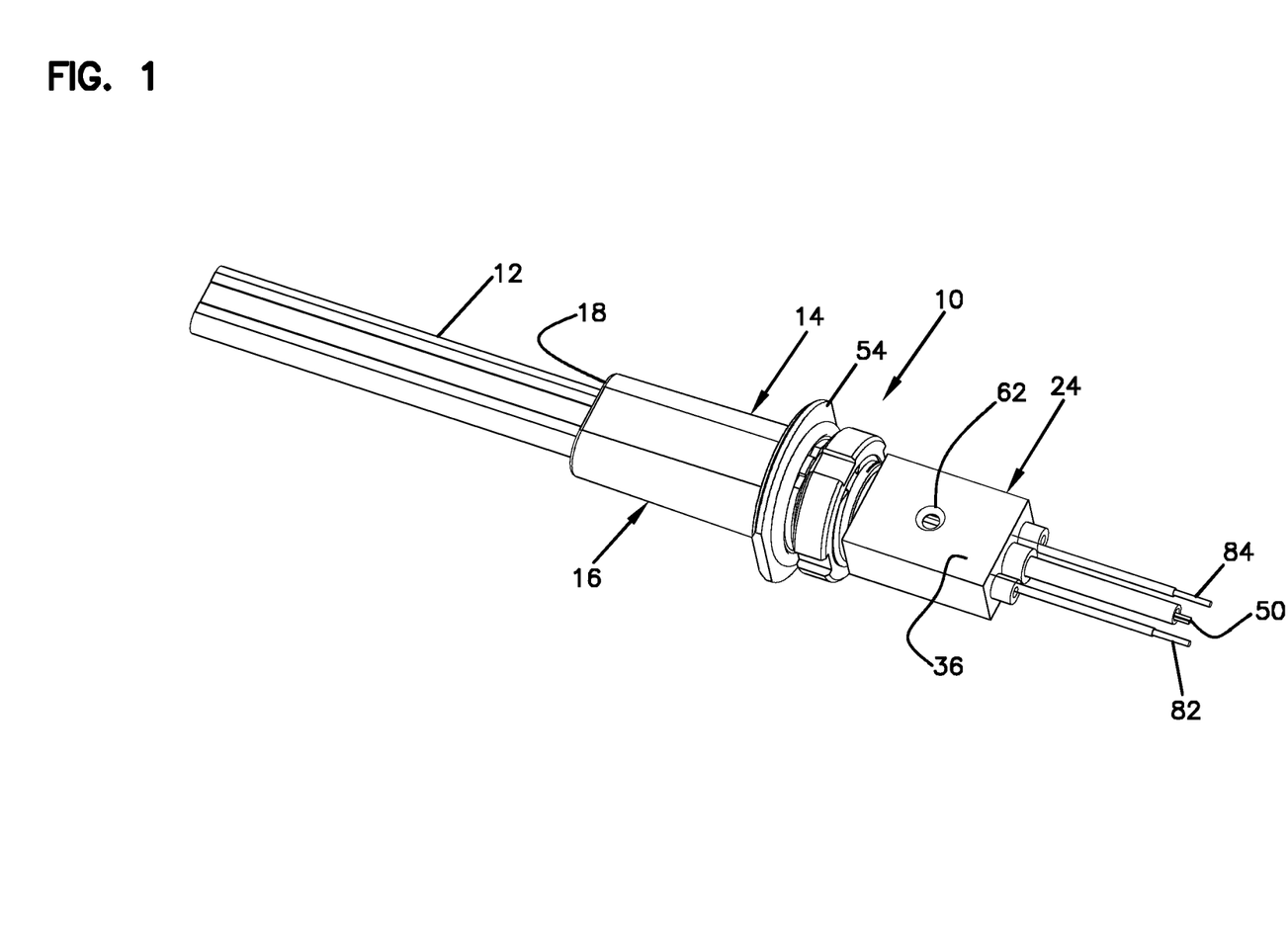
FIG. 1 is an isometric view of a hybrid cable connected to a plug in accordance with the principles of the present disclosure.
Figure 2:
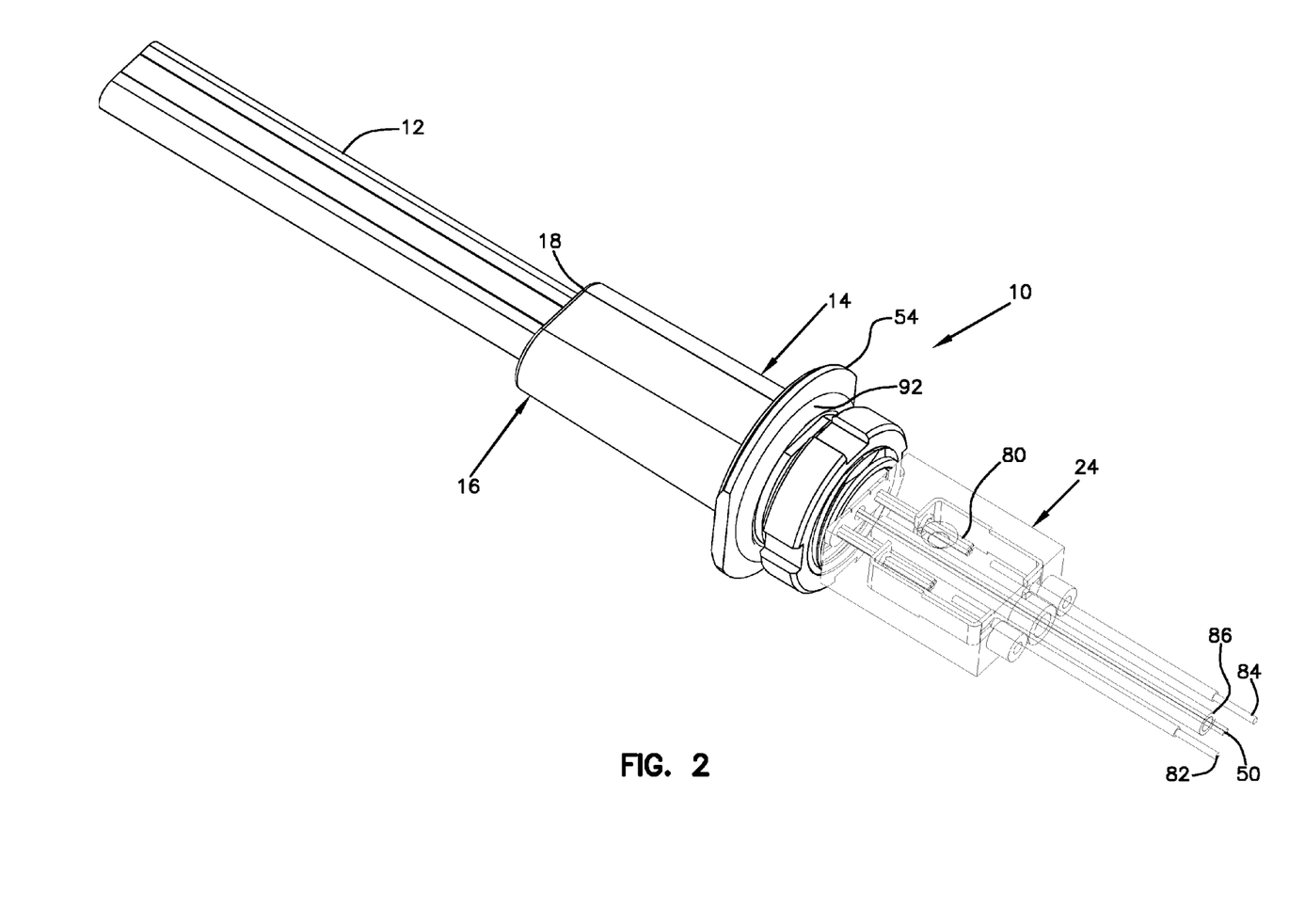
FIG. 2 is an isometric view of FIG. 1 showing the internal connections between the plug and hybrid cable of FIG. 1.
Figure 3:
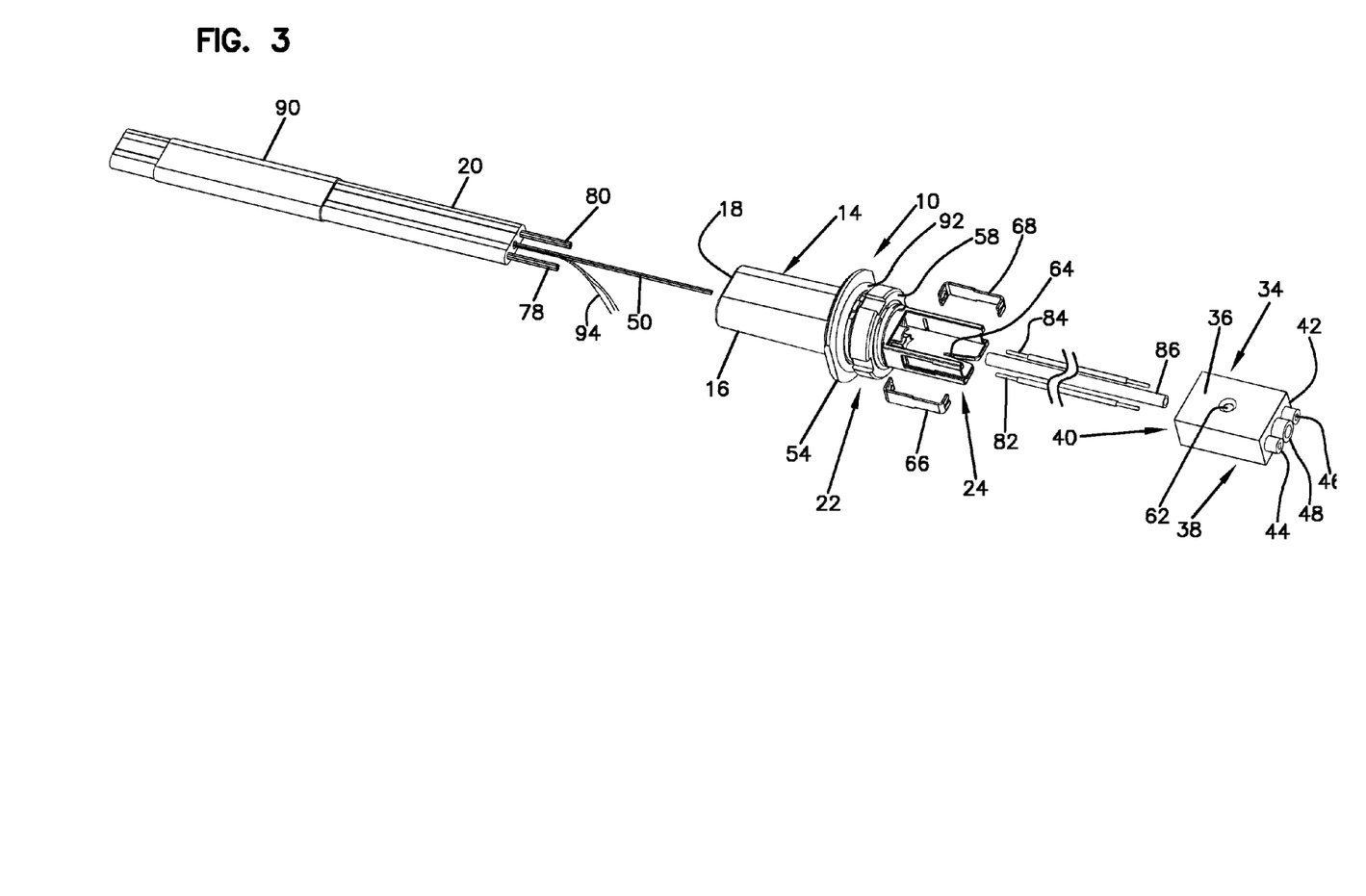
FIG. 3 is an isometric view of a hybrid cable before it is engaged with the plug of FIG. 1.
Figure 4:
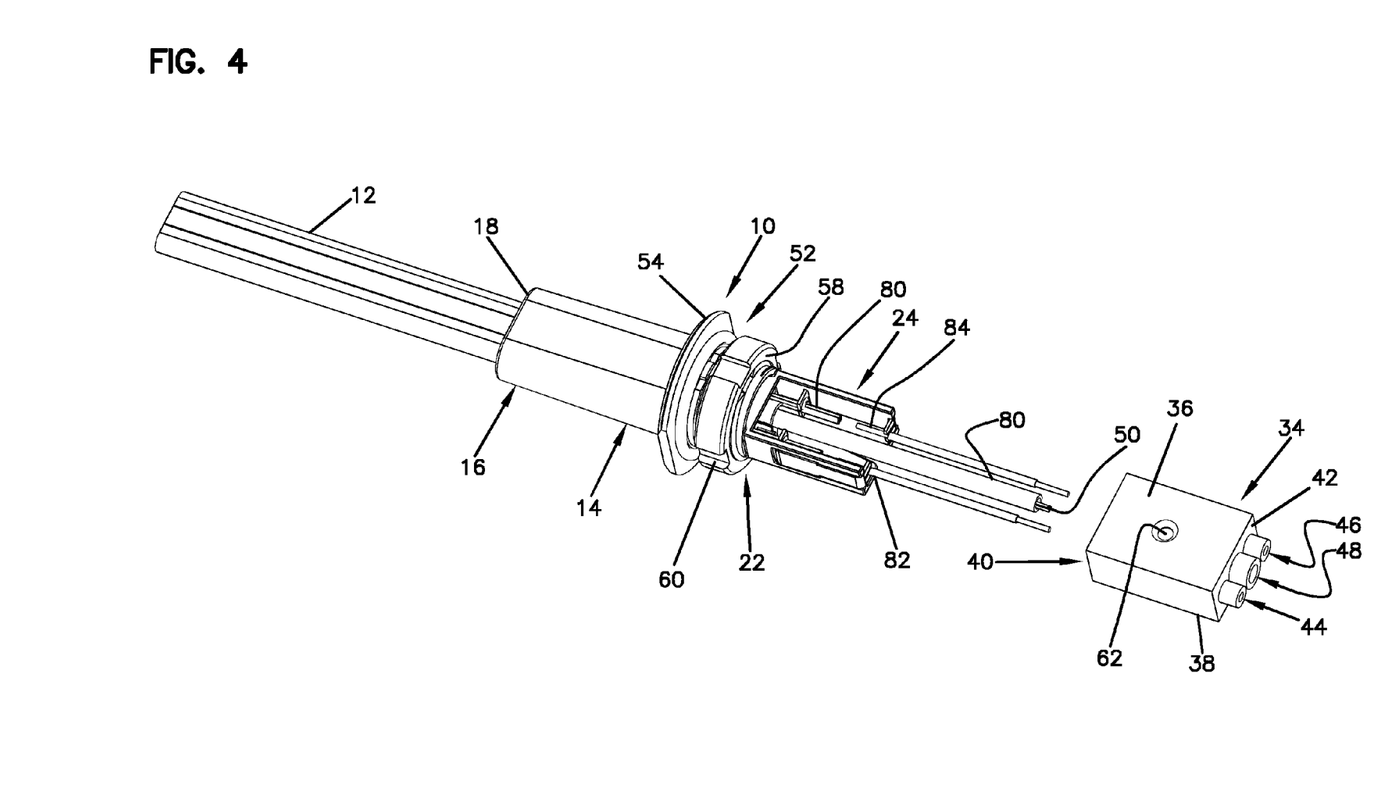
FIG. 4 is an isometric view of a hybrid cable after it has been inserted into a first end of the plug of FIG. 1 and before potting.
Figure 5:
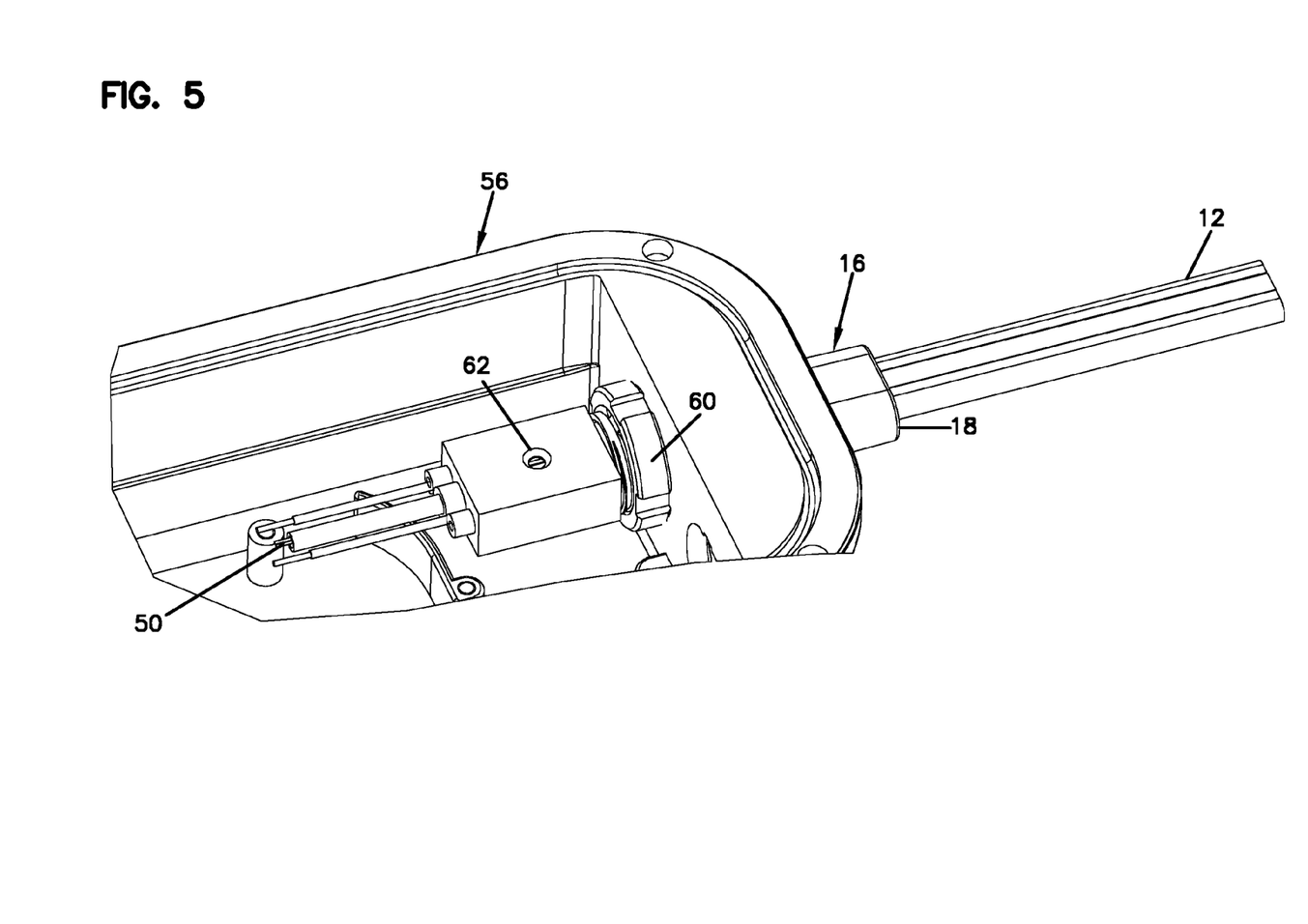
FIG. 5 is an isometric view of a hybrid cable connected to the plug of FIG. 1 and the plug of FIG. 1 connected to a closure.
Figure 6:
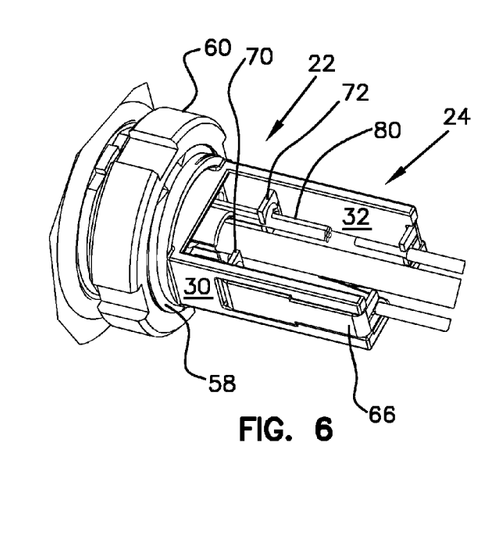
FIG. 6 is an enlarged view of the second end of the plug of FIG. 1 with optical fibers and conductors connected thereto.
Figure 7:
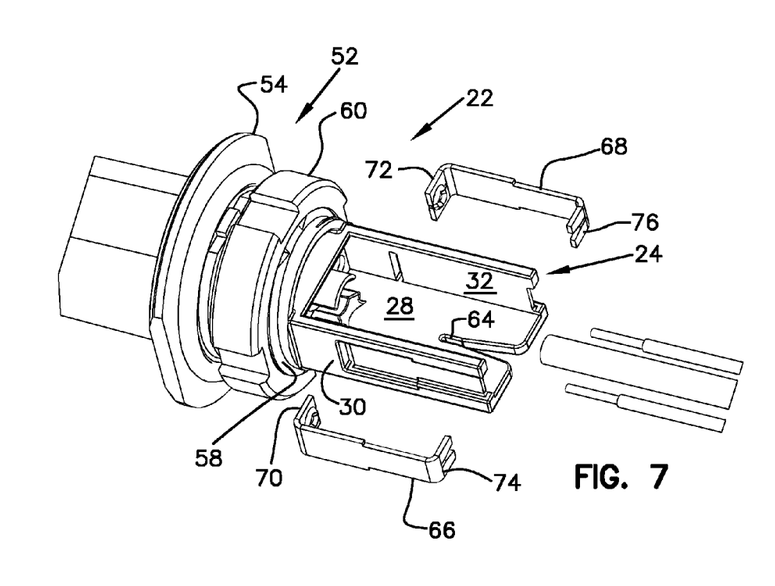
FIG. 7 is an assembly view of the second end of the plug of FIG. 1.
Figure 8:
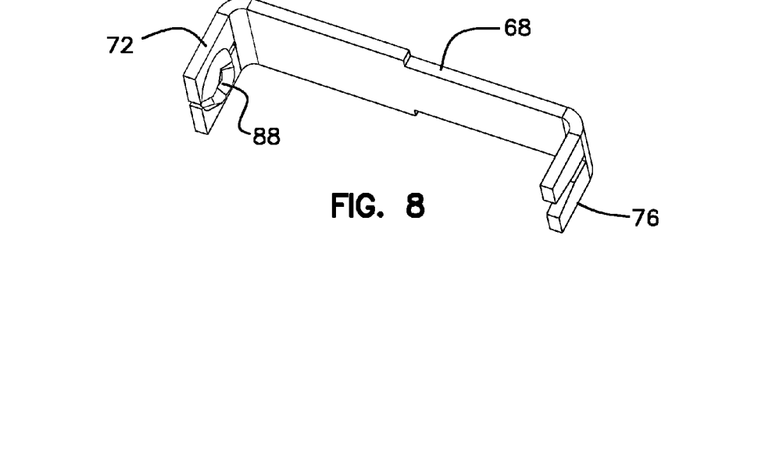
FIG. 8 is an enlarged view of a conductive bracket of the plug of FIG. 1.
Figure 9:
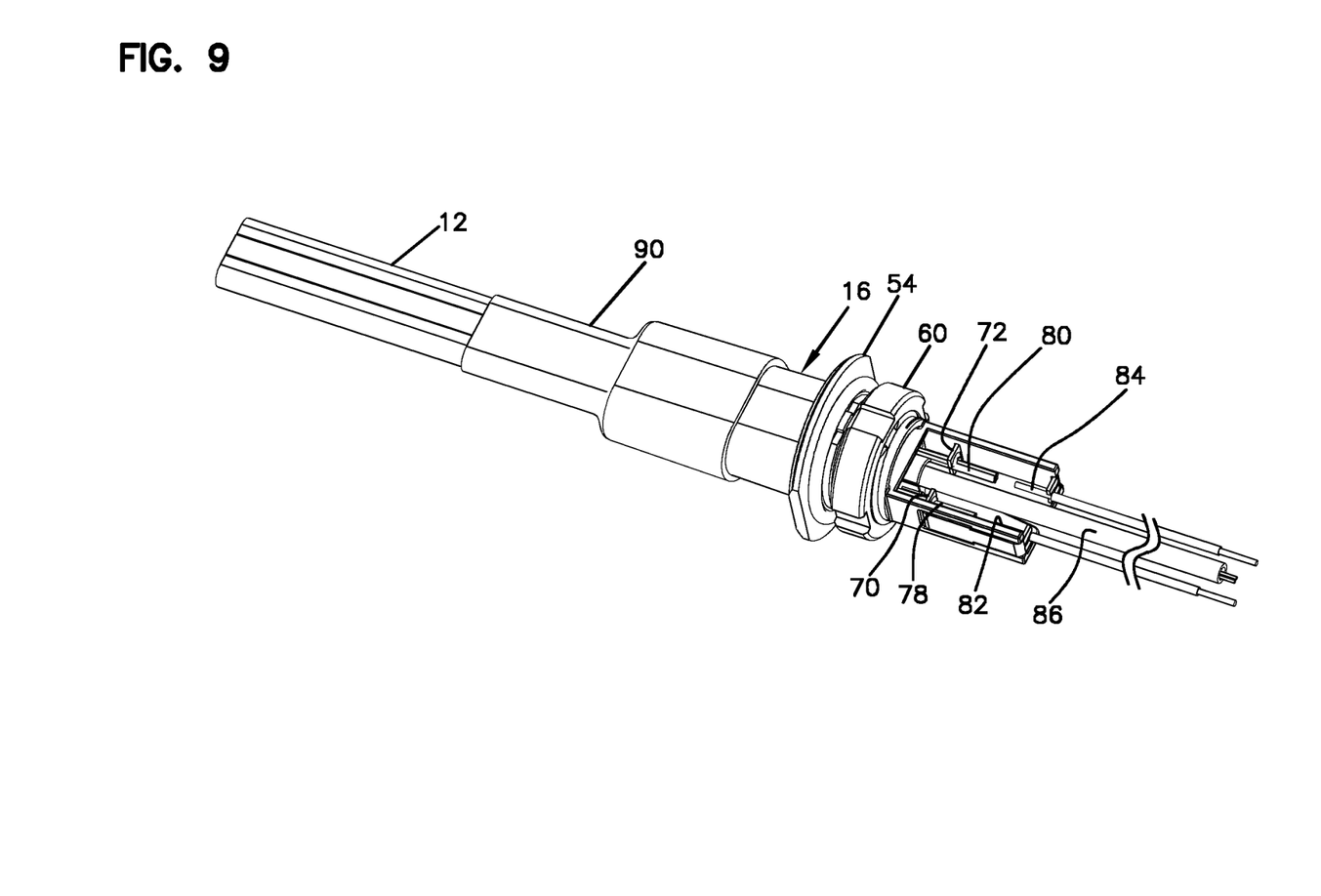
FIG. 9 is an isometric view of the plug of FIG. 1 with the cover removed and heat shrunk to the hybrid cable.

Referring to FIGS. 1-9, an embodiment of a sealing and retention plug 10 for a jacketed hybrid electrical optical cable 12 in accordance with the principles of the present disclosure is described in further detail. In the depicted embodiment, the plug assembly 10 includes a plug body 14. The plug body 14 includes a first end portion 16 and a second end portion 22. The first end portion 16 of the plug body 10 includes an opening at its distal end 18. In the depicted embodiment, the opening at the distal end 18 is configured to receive a distal end portion 20 of a jacketed hybrid electrical optical cable 12. In the depicted embodiment the first end portion 16 of the plug body 10 is configured to slide over a distal end portion 20 of a jacketed hybrid electrical optical cable 12. The cross-sectional size and shape of the first end portion 16 is configured to match the cross-sectional size and shape of the jacketed hybrid electrical cable 12 so that the distal end portion 20 of jacketed hybrid cable 12 can be hand fit into the first end portion 16 of the plug body 10. It should be appreciated that many other alternative configurations are possible. In alternative embodiments, the first end portion could have a different cross-sectional shape and size than the cross-sectional size and shape of the jacketed hybrid electrical optical cable 12. In alternative embodiments, the distal end portion 20 of the jacketed hybrid electrical optical cable 12 may not be received within the first end portion 16 of the plug body 10.

In the depicted embodiment, the second end portion 22 of the plug body 10 includes a potting housing 24. In the depicted embodiment, the potting housing 24 includes a bottom wall 28 and two opposed sidewalls 30, 32. In the depicted embodiment, the second end portion 22 also includes a cover assembly 34. The cover assembly 34 in the depicted embodiment is configured to slide over the potting housing 24. The cover assembly 34 includes a top wall 36 a bottom wall 38, and an open first end 40. The open first end 40 is configured to receive the potting housing 24 as the cover assembly 34 is slid over the potting housing 24. In the depicted embodiment, a second end wall 42 is located opposite the open first end 40. The second wall 42 includes a pair of conductor apertures 44, 46 for receiving conductors and a fiber aperture 48 for receiving one or more of optical fibers 50. It should be appreciated that many other alternative configurations are possible. In alternative embodiments, the potting housing 24 and cover assembly 34 could be different from what is depicted in the FIGS. For example, in an alternative embodiment, the potting housing may not have side walls. In alternative embodiments, the cover assembly may be a lid or cap that snaps over the potting housing as opposed to a structure that slides over and receives the potting housing as shown in the depicted embodiment.

In the depicted embodiment, a closure interface assembly 52 located between the first end portion 16 and second end portion 22 of the plug body 10. In the depicted embodiment, the closure interface assembly 52 includes a flange 54 configured to engage and abut the exterior of a closure 56. In the depicted embodiment, the flange 54 prevents the plug body from further extending into the closure as it is larger than the aperture in the closure that is configured to receive the plug body 10. In the depicted embodiment, the closure interface assembly 52 further comprises a threaded barrel 58 located adjacent the flange 54. A nut 60 is engaged with the threaded barrel 58 and arranged and configured to be tightened against an interior surface of the closure 56 thereby driving the flange 54 against the closure 56 and securing the plug body 10 onto the closure. In the depicted embodiment the closure interface assembly provides a sealed watertight connection between the plug body 10 and the closure 56. In the depicted embodiment an O-ring 92 is located around the threaded barrel 58. When the nut 60 is tightened the O-ring 92 seals the plug body 10 to the wall of the closure 56 to limit moisture intrusion into the closure. It should be appreciated that many other alternative configurations of the closure interface assembly are possible.

In the depicted embodiment, the cover assembly 34 is constructed of a translucent material. In the depicted embodiment, top wall 36 and bottom wall 38 of the cover assembly (34) are structurally the same and are both translucent. The cover assembly 34 is configured such that it can be slid over the potting housing 24 with either the bottom wall 28 of the potting housing 24 being adjacent to either the top wall 36 of the cover assembly 34 or, alternatively, the bottom wall 38 of the cover assembly 34 being adjacent the bottom wall 28 of the potting housing 24. This symmetric configuration of the cover assembly 34 simplifies the assembly. Regardless of the orientation of the cover assembly, once positioned over the potting housing 24, the components within the potting housing 24 are viewable. This allows for a quick and easy visual inspection of the fiber and electrical connections. It should be appreciated that many other alternative configurations are possible. For example, in alternative embodiments, the cover assembly may not slide over the potting housing and the cover assembly may not be translucent.

In the depicted embodiment, both the top wall 36 and bottom wall 38 of the cover assembly 34 include a port 62 through which epoxy, glue or any other potting agent can be injected into the potting housing 24. In the depicted embodiment, the fiber aperture 48 is located between the pair of conductor apertures 44, 46. In the depicted embodiment, the relative positions of the pair of conductors and optical fibers are also such that the optical fibers are located between the pair of conductors. As discussed above, it should be appreciated that many other alternative configurations of the cover assembly are possible.

In the depicted embodiment, the potting housing 24 includes an anchor 64 for securing tension members that extend from the jacketed hybrid electrical optical cable 12. Often aramid fibers are located among the plurality of optical fibers 50 to provide support to the cable and enable it to withstand tension forces without causing damage to the plurality of optical fibers 50 or the conductors in the cable. The aramid fibers can be gathered together and forced into a V-shaped opening at a distal periphery edge of the bottom wall 28 of the potting housing. The tension members can be jammed and hence locked into place in the V-shaped opening. The fibers can also be folded back along the outside surface of the bottom wall 28 of the potting housing 24. Once the cover assembly 34 is positioned over the potting housing the aramid fibers are sandwiched between bottom wall 28 of the potting housing 24 and the cover assembly 34. Filling the potting housing with epoxy further secures the aramid fibers in place and allows them to continue to protect the plurality of optical fibers 50 and the conductors from damage due to tension on the hybrid cable 12. As discussed above, it should be appreciated that many other alternative configurations of the potting housing are possible including embodiments that have no aramid fibers (strength members) anchors and embodiments that have different anchoring configurations.

In the depicted embodiment, the potting housing includes a pair of conductive brackets 66, 68. In the depicted embodiment, a body portion of each of the conductive brackets 66, 68 is recessed into the two opposed side walls 30, 32 of the potting housing 24. Each of the conductive brackets 66, 68 includes a first tabbed end 70, 72 and a second tabbed end 74, 76. In the depicted embodiment, both the first tabbed ends 70, 72 and the second tabbed ends 74, 76 extend through the two opposed side walls 30, 32 of the potting housing (24). The first tabbed ends 70, 72 are each configured to receive and secure an end portion of conductors 78, 80 that extend from the jacketed hybrid electrical optical cable 12. In the depicted embodiment, the first tabbed end is configured such that the end of the conductors of the jacketed hybrid cable 12 can be extended through an aperture 88 in the first tabbed ends 70, 72. The aperture includes at least one locking mechanism that allows the conductor to extend into the aperture and provides mechanical resistance against the conductor from being pulled backwards out of the first tabbed ends 70, 72. The second tabbed ends 74, 76 are each configured to receive and secure an end portion of a conductor 82, 84 that extends out of the second end wall 42 of the cover assembly 34 towards whatever device is connected thereto. In the depicted embodiment, the second tabbed ends include a fork shaped portion that enables side engagement and securing of a conductor, which would extend through the conductor aperture in the second end wall of the cover assembly. As discussed above, it should be appreciated that many other alternative configurations of the potting housing are possible. Some alternative embodiments have no brackets and others have brackets of different constructions.

A method of connecting a jacketed hybrid electrical optical cable 12 to telecommunication equipment is also provided. In the depicted embodiment, the method comprises a number of steps in no specific order. It should be appreciated that some embodiments of the method include fewer steps than identified below, whereas other embodiments of the method include more steps. Some steps of the method according to the principles of the present disclosure are identified and described in further detail below.

In the depicted embodiment, the method can include the steps of exposing end portions of a pair of conductors 78, 80 of a hybrid cable 12, one or more of optical fibers 50 and a plurality of strength members 94 from a distal end portion of a jacketed hybrid electrical optical cable 12. The step of exposing the conductors and optical fibers could be accomplished in the field with hand tools or at the factory.

In the depicted embodiment, the method can also include the step of connecting a plug body 10 to a closure 56 such that a first end portion 16 of the plug body is external to the closure, and a second end portion 22 of the plug body is internal to the closure 56. The step of connecting a plug body 10 to a closure 56 can include the step of extending the second end portion 22 of the plug body 10 into an aperture of the closure 56 until a flange 54 of the plug body engages and abuts an exterior surface of the closure 56. The step of connecting can further include the step of threading a nut 60 onto a threaded barrel portion of the second end of the plug body 10 until a sealing O-ring 92 is compressed against an inside surface of the closure and the flange is driven against the exterior of the closure.

In the depicted embodiment, the method can also include the steps of extending the distal end portion of the jacketed hybrid electrical optical cable 12 through first end portion 16 of the plug body 10 as well as the step of securing the distal end portion of the jacketed hybrid electrical optical cable 12 to the plug body 10. In the depicted embodiment, the step of securing the distal end portion of the jacketed hybrid electrical optical cable 12 to the plug body includes applying a heat shrinking sleeve 90 to the jacketed hybrid electrical optical cable 12 to secure the first end portion 16 of a plug body 10. It should be appreciated than many alternative or auxiliary securing steps are possible other than heat shrinking.

In the depicted embodiment, the method can include the steps of electrically connecting the pair of conductors 78, 80 of the jacketed hybrid electrical optical cable 12 to a pair of metal tabs 70, 72 mounted in a potting housing 24 of a plug body 10, the potting housing 24 located at the second end portion 22 of the plug body 10. The step of electrically connecting the pair of conductors 78, 80 to a pair of metal tabs 70, 72 mounted to the plug body 10 can include the step of inserting ends of the conductors 78, 80 through apertures in the tabs 70, 72 that are configured to receive and mechanically secure ends of the pair of conductors 78, 80. It should be appreciated than there exist alternative ways to make electrical connection with the conductors of the hybrid cable other than connecting them to metal tabs as described above.

In the depicted embodiment, the method can include the steps of extending a pair of secondary conductors 82, 84 through a cover assembly 34 and engaging end portions of the pair of secondary conductors 82, 84 with conductive contacts 74, 76 located in the potting housing 24. The step of engaging end portions of the pair of secondary conductors 82, 84 with conductive contacts 78, 80 located in the potting housing 24 can include engaging exposed end portions of the secondary conductors 82, 84 with conductive forked shaped conductive tabs 74, 76. It should be appreciated than there exist alternative ways to make electrical connection with the conductors that extend out of the potting housing other than connecting them to metal tabs as described above.

In the depicted embodiment, the method can include the steps of guiding the plurality of optical fibers 50 out of the cover assembly 34. The step of guiding the plurality of optical fibers 50 out of the cover assembly 34 can include sliding a protective over-tubing 86 over the plurality of optical fibers 50 and directing the protective over-tubing through an aperture 48 in the cover assembly 34. It should be appreciated that many other alternative ways to guide the optical fibers from the hybrid cable out of the potting are possible.

In the depicted embodiment, the method can include the steps of positioning the cover assembly 34 over the potting housing 24. In the depicted embodiment, the step of positioning the cover assembly 34 over the potting housing 24 can include sliding the cover assembly 34 over the potting housing 24, thereby defining an enclosed potting volume configured to receive and retain epoxy. In the depicted embodiment, the method also includes the step of filling the potting housing 24 with an epoxy. It should be appreciated that many other alternative ways exist to define an enclosed potting volume other than sliding a cover assembly over a potting housing.

In the depicted embodiment, the method can include the steps of curing the epoxy and visually inspecting electrical connections in the potting housing 24 by viewing the connections through the cover assembly 34. In alternative embodiments either the cover or epoxy or both could be opaque and many not allow for visual inspection of the potted electrical connections.

In the depicted embodiment, the method can include the steps of anchoring the plurality of tension members of the jacketed hybrid electrical optical cable 12 to the plug body 10. The step of anchoring tension members of the jacketed hybrid electrical optical cable 12 to the plug body 10 can include collecting together and folding the tension member over a portion of the plug body 10. It should be appreciated that many alternative ways to manage the strength members 94 (e.g., aramid fibers) are possible.

The above specification, examples and data provide a complete description of the manufacture and use of the composition of the invention. Since many embodiments of the invention can be made without departing from the spirit and scope of the invention, the invention resides in the claims hereinafter appended.

PARTS LISTING (10) sealing and retention plug; plug; plug assembly
(12) jacketed hybrid electrical optical cable
(14) plug body
(16) first end portion of the plug body
(18) distal end of the first end portion of the plug body
(20) distal end portion of the jacketed hybrid electrical optical cable
(22) second end portion of the plug body
(24) potting housing
(28) bottom wall of potting housing
(30, 32) two opposed side walls of the potting housing
(34) cover assembly
(36) top wall of the cover assembly
(38) bottom wall of the cover assembly
(40) open first end of the cover assembly
(42) second end wall of the cover assembly
(44, 46) pair of conductor apertures of the cover assembly
(48) fiber aperture of the cover assembly
(50) plurality of optical fibers
(52) closure interface assembly
(54) flange of the closure interface assembly
(56) closure
(58) threaded barrel of closure interface assembly of the plug
(60) nut of the closure interface assembly
(62) port of the cover assembly
(64) anchor for securing tension members
(66, 68) conductive brackets
(70, 72) first tabbed end of the conductive brackets
(74, 76) second tabbed ends of the conductive brackets; conductive contacts; forked shaped conductive tabs
(78, 80) end portion of a conductor of the jacketed hybrid electrical optical cable
(82, 84) end portion of a conductor that extends out of the second end wall of the cover assembly; secondary conductors
(86) protective over-tubing
(88) aperture in the first tabbed ends of the conductive brackets
(90) heat shrinking sleeve
(92) O-ring
(94) strength members

We claim:

1. A sealing and retention plug for a jacketed hybrid electrical optical cable, comprising:
    a plug assembly including a plug body, the plug body including:
        a first end portion including an opening at a distal end configured to receive a jacketed hybrid electrical optical cable, the first end portion configured to slide over a distal end portion of a jacketed hybrid electrical optical cable;
    a second end portion including:
        a potting housing, the potting housing including a bottom wall and two opposed side walls;
        a cover assembly that is configured to slide over the potting housing, the cover assembly including a top wall a bottom wall, an open first end and a second end wall, the second end wall including a pair of conductor apertures for receiving conductors and a fiber aperture for receiving one or more of optical fibers; and
    a closure interface assembly located between the first end portion and second end portion, the closure interface assembly includes a flange configured to engage the exterior of a closure, the closure interface assembly further comprises a threaded barrel adjacent the flange and a nut that is configured to engage the threaded barrel and tightened to drive the flange against the closure.

2. The sealing and retention plug of claim 1, wherein potting housing includes conductive brackets each conductive bracket includes a first tabbed end and a second tabbed end, the first and second tabbed ends extend through the two opposed side walls of the potting housing, the first tabbed ends are each configured to receive and secure an end portion of a conductor of the jacketed hybrid electrical optical cable, the second tabbed ends are each configured to receive and secure an end portion of a conductor that extends out of the second end wall of the cover assembly.

3. The sealing and retention plug of claim 2, wherein the first tabbed ends of the conductive brackets are configured such that the end of the conductor of the jacketed hybrid cable can be extended through an aperture in the first tabbed ends, the aperture including at least one locking mechanism configured to allow the conductor to extend into the aperture and mechanically resists the conductor from being pulled backwards out of the first tabbed end.

4. The sealing and retention plug of claim 2, wherein the second tabbed ends include a fork shaped portion that enables sliding engagement and the securing of a conductor that extends through the conductor aperture in the second end wall of the cover assembly.

5. The sealing and retention plug of claim 2, wherein a body portion of the conductive brackets are recessed into the two opposed side walls of the potting housing.

6. The sealing and retention plug of claim 1, wherein the top wall and bottom wall of the cover assembly are translucent.

7. The sealing and retention plug of claim 1, wherein both the top wall and bottom wall of the cover assembly include a port through which epoxy can be injected into the potting housing.

8. The sealing and retention plug of claim 1, wherein the cover assembly is configured such that it can be engaged with the potting housing with either the top wall of the cover assembly opposite the bottom wall of the potting housing or the top wall of the cover assembly adjacent the bottom wall of the potting housing.

9. The sealing and retention plug of claim 1, wherein the fiber aperture is located between the pair of conductor apertures.

10. The sealing and retention plug of claim 1, wherein the potting housing includes an anchor for securing strength members that extend from the jacketed hybrid electrical optical cable.

11. The sealing and retention plug of claim 1, wherein the bottom wall of the potting housing include a V-shaped opening at a distal periphery edge that is configured to manage strength members that extend from the jacketed hybrid electrical optical cable and guide the strength members between the exterior of the bottom wall of the potting housing and a wall of the cover assembly.

12. A method of connecting a jacketed hybrid electrical optical cable to telecommunication equipment, the method comprising:

exposing end portions of a pair of conductors, one or more of optical fibers and a plurality of tensioning members from a distal end portion of a jacketed hybrid electrical optical cable;

connecting a plug body to a closure such that a first end portion of the plug body is external to the closure and a second end portion of the plug body is internal to the closure;

extending the distal end portion of the jacketed hybrid electrical optical cable through the first end portion of the plug body;

securing the distal end portion of the jacketed hybrid electrical optical cable to the plug body;

electrically connecting the pair of conductors of the jacketed hybrid electrical optical cable to a pair of metal tabs mounted in a potting housing of a plug body, the potting housing located at the second end portion of the plug body;

extending a pair of secondary conductors through a cover assembly and engaging end portions of the pair of secondary conductors with conductive contacts located in the potting housing;

guiding the plurality of optical fibers out of the cover assembly;

positioning the cover assembly over the potting housing; and filling the potting housing with an epoxy.

13. The method of claim 12, wherein the step of positioning the cover assembly over the potting housing includes sliding the cover assembly over the potting housing thereby defining an enclosed potting volume configured to receive and retain epoxy.

14. The method of claim 12, wherein the step of connecting a plug body to a closure includes the step of extending the second end portion of the plug body into an aperture of the closure until a flange of the plug body engages an exterior surface of the closure and threading a nut onto a threaded portion of the second end of the plug body until a sealing ring is compressed against an inside surface of the closure.

15. The method of claim 12, wherein the step of guiding the plurality of optical fibers out of the cover assembly includes sliding a protective over-tubing over the plurality of optical fibers and directing the protective over-tubing through an aperture in the cover assembly.

16. The method of claim 12, wherein the step of securing the distal end portion of the jacketed hybrid electrical optical cable to the plug body includes heat shrinking the jacketed hybrid electrical optical cable to the first end portion of a plug body.

17. The method of claim 12, wherein the step of electrically connecting the pair of conductors to a pair of metal tabs mounted to the plug body includes the step of inserting ends of the conductors through apertures in the tabs configured to receive and mechanically secure ends of the pair of conductors.

18. The method of claim 12, wherein the step of engaging end portions of the pair of secondary conductors with conductive contacts located in the potting housing includes engaging exposed end portions of the secondary conductors with conductive forked shaped conductive tabs.

19. The method of claim 12, further comprising the step of curing the epoxy and visually inspecting electrical connections in the potting housing by viewing the electrical connections through the cover assembly.

20. The method of claim 12, further comprising the step of anchoring the plurality of tension members of the jacketed hybrid electrical optical cable to the plug body.

21. The method of claim 20, wherein the step of anchoring tension members of the jacketed hybrid electrical optical cable to the plug body includes collecting together and folding the tension member over a portion of the plug body.

22. The sealing and retention plug of claim 1, further comprising a closure configured to house telecommunication components.

* * * * *